United States Patent [19]
Duffey

[11] 3,772,851

[45] Nov. 20, 1973

[54] DUST MONITORING SYSTEM AND METHOD

[76] Inventor: Joseph G. Duffey, 247 Sherbrook Dr., Williamsville, N.Y. 14221

[22] Filed: Mar. 24, 1972

[21] Appl. No.: 237,794

[52] U.S. Cl. .......................... 55/18, 55/97, 55/212, 55/270, 55/338, 55/341, 73/28, 73/421.5, 110/119, 137/88, 236/15 E
[51] Int. Cl. ............................................. B01d 46/02
[58] Field of Search ...................... 55/1, 18, 21, 97, 55/212, 270, 213, 274, 312-314, 338, 341; 73/28, 421.5; 137/88; 302/42; 110/119; 236/15 E

[56] References Cited
UNITED STATES PATENTS
2,458,674   1/1949   Blanchard et al......................... 55/1
3,257,798   6/1966   Hass....................................... 55/312

FOREIGN PATENTS OR APPLICATIONS
955,741   1/1957   Germany .............................. 55/314

Primary Examiner—Bernard Nozick
Attorney—Conrad Christel et al.

[57] ABSTRACT

A method of and system for monitoring a gaseous effluent and treating only a portion of such effluent to remove particulates and/or gaseous contaminants therefrom to bring the total discharged effluent within permissable limits. The total effluent is analyzed to determine the particulate and/or the contaminated gaseous content and a control monitor, responsive to the results of the analysis, is effective to vary the proportion of effluent treated relative to the untreated portion.

6 Claims, 2 Drawing Figures

DUST MONITORING SYSTEM AND METHOD

BACKGROUND OF THE INVENTION

This invention relates generally to a method of and system for monitoring contaminated gaseous effluents for removing only a portion of the contaminants from such effluents.

Many industrial buildings housing dust producing operations such as electric furnaces, material handling processes and the like, utilize an elongated manifold vent or duct adjacent the ceiling of the building and which generally extends lengthwise thereof for collecting and directing the upwardly flowing dust and contaminated gases outwardly into the atmosphere. Due to the increased concern in environmental control, many recently promulgated pollution abatement laws require that only a given fixed quantity of particulate matter and polluted gaseous components per volume of gas flow can be emitted into the atmosphere within a given time period. While this poses a critical contaminant removal problem because of the enormous quantities or volume of contaminated gases being processed through the vent in a large industrial facility, all the known attempts made to solve this problem have been predicated on removing all the particulates or contaminated gaseous components from the gaseous effluent discharged into the atmosphere. Not only is the capital investment and equipment requirement prohibitively costly, but operating costs are excessively high.

SUMMARY OF THE INVENTION

Accordingly, it is a primary object of the present invention to provide a monitoring system and method for treating only a portion of contaminated gases to remove the contaminants therefrom so that the total effluent discharged contains only that amount of contaminants permissible under anti-pollution laws.

It is another object of this invention to provide the foregoing system with a contaminant detection and control arrangement for varying the proportions of the gases to be treated or cleaned relative to the untreated portion in accordance with the amount of contaminants detected in the total effluent.

These and other objects, advantages and characterizing features of the present invention will become clearly apparent from the ensuing detailed description of certain illustrative embodiments thereof, taken together with the accompanying drawings wherein like reference numerals denote like parts throughout.

BRIEF DESCRIPTION OF THE DRAWING FIGURES

FIG. 1 is a schematic view of one form of a contaminant monitoring system of this invention; and FIG. 2 is a schematic view of another form of a contaminant monitoring system of the present invention.

DETAILED DESCRIPTION OF ILLUSTRATIVE EMBODIMENTS

While this invention is equally applicable to the removal of particulates and harmful or contaminated gaseous components, or both, from a gaseous effluent, it will be convenient to describe the following embodiments in connection with dust removal operations only.

Figure 1:
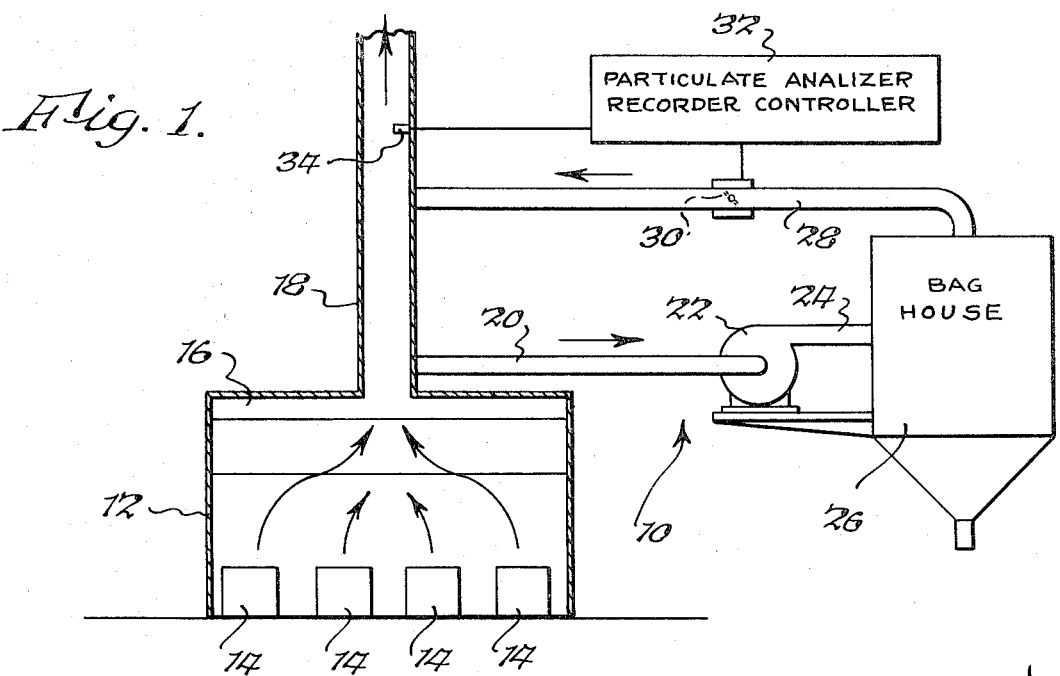

Referring now in detail to one illustrative embodiment depicted in the drawings, there is schematically shown in FIG. 1 a dust removal system, generally designated 10, of this invention for monitoring the amount of dust or solid particles emitted into the atmosphere or some other station from an industrial building 12 housing a plurality of furnaces 14. However, building 12 can represent any industrial facility in which dust generating operations are carried out. The dust-laden gases flow upwardly into a gas collecting vent manifold or channel 16 mounted along the ceiling of building 12 and extending generally lengthwise thereof. The gases collected in vent channel 16 are discharged through an upright stack 18 mounted generally centrally of channel 16 and having an outlet (not shown) leading to the atmosphere.

Conduit means are tapped into stack 18 at vertically spaced locations for rerouting or circulating a portion of the effluent gases therethrough for a purpose to be explained. Such conduit means includes a conduit 20 having one end thereof in communication with the lower end of stack 18, the other end being connected to a centrifugal pump or blower 22 for withdrawing a portion of the gases from stack 18 by a suction force and delivering the same via a conduit 24 to a gas treating means, such as a conventional bag house 26 for example, for removing particulates from such gaseous portion. While bag house 26 is illustrative of one type of dust removing or gas purifying apparatus that can be employed in the dust removal system of this invention, it should be understood that any suitable dust or particulate removing apparatus, such as a dust collector, a gas scrubber, an electric precipitator and the like, can be used in lieu of bag house 26, if desired. In the illustrative embodiment, bag house 26 is provided with an outlet in communication with one end of a conduit 28, the other end of conduit 28 being tapped into an intermediate portion of stack 18. A pivotable damper or valve 30 is mounted in conduit 28 for controlling the flow of clean gases therethrough. The extent to which valve 30 is opened determines the proportion of contaminated gases withdrawn from stack 18 through conduit 20 for processing through bag house 26.

A particulate monitor 32, such as that offered by the General Electric Company, is incorporated in dust removal system 10 and is provided with a probe 34 located in stack 18 adjacent the upper end thereof for sensing the amount or concentration of solid particles present in the gaseous effluent rising upwardly in stack 18. A signal corresponding to the results sensed by probe 34 is transmitted to an analyzer (not shown) in monitor 32 which compares this signal with an adjustable reference signal adapted to reflect any desired or allowable concentration of solids in the gaseous effluent. A control means (not shown) in monitor 32 is operatively connected to valve 30 for actuating the latter. The control means is responsive to the output signal of the analyzer which corresponds to the difference between the reference signal and the signal generated by probe 34 to adjust the opening of valve 30 toward an open or closed position according to the particulate content of the gaseous effluent, as determined by probe 34.

Prior to use, the reference signal generated in particulate monitor 32 is adjusted to correspond to the desired amount of solids permitted to pass into the atmosphere, as dictated by the local pollution abatement code, and should approach, but not exceed, this maximum permissable limit. If for example, the code permits the emission of a given volume of effluent containing six pounds of dust or solid particles per hour, the setting of the reference signal in monitor 32 should indicate a particulate concentration just slightly below this level.

In operation, the dust-laden effluent flowing upwardly in building 12 and collected in manifold channel 16 is conveyed upwardly as a mainstream through stack 18 into the atmosphere. It should be understood that in lieu of discharging the final effluent into the atmosphere, it can be directed to some other point or station upstream of probe 34, such as a heating or drying facility if the effluent contains gases of elevated temperatures for example. The amount of solids in the effluent mainstream is detected by probe 34. If the amount of solids detected in the effluent is greater than the setting of monitor 32, the detection responsive control means therein becomes operative to actuate and further open valve 30 creating a greater pressure differential in conduit means 20–28 to cause the continuously operating blower 22 to withdraw a larger proportion of the effluent from the lower end of stack 18 for processing through bag house 26. The treated or cleaned effluent discharged from bag house 26 is conveyed through conduit 28 into the intermediate portion of stack 18 and commingled with the contaminated, untreated portion of the effluent flowing directly upwardly through stack 18 so that the total resultant effluent contains only the legal, allowable, amount of solids that may enter the enviroment in compliance with the pollution abatement code. On the other hand, if the effluent, as detected by probe 34, contains less solids than the setting of monitor 32, the detection responsive means therein is operable to actuate valve 30 to reduce the flow of cleaned gases therethrough to effect withdrawal of a lesser proportion of the contaminated effluent through conduit 20 for processing through bag house 26. This reduces the load on blower 22 to appreciably lower operating costs.

Figure 2:
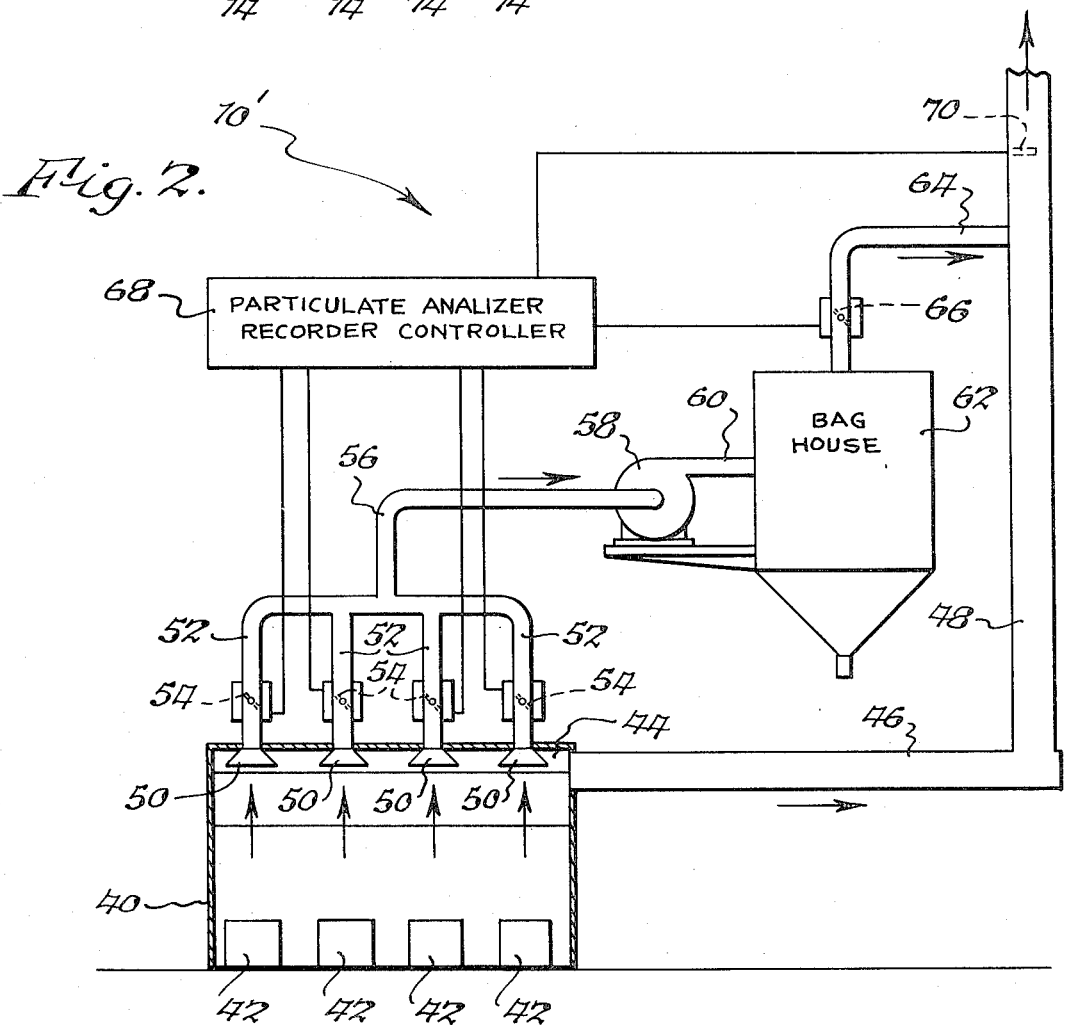

FIG. 2 schematically illustrates another form of dust removal system 10' of this invention for monitoring the amount of dust or solid particles emitted into the atmosphere from a dust producing industrial building 40 containing a plurality of furnaces 42. Building 40 is provided with a gas collecting manifold vent or channel 44 adjacent the ceiling thereof having an outlet in communication with a conduit 46 leading to a stack 48 for conveying the gaseous effluent upwardly into the atmosphere or some other station, as desired.

The circuit means for withdrawing a proportion of the dust-laden gases from vent channel 44 includes four ducts 50 spaced longitudinally thereof, each duct 50 communicating with a conduit 52 provided with a damper or valve 54 therein to control the flow of the contaminated gases therethrough into a common conduit 56 leading to a blower 58 which delivers the contaminated gases via conduit 60 to a gas treating means for removing particulates therefrom, such as a bag house 62 for example. This multiple pick-up arrangement is especially desirable in large buildings, which may contain as many as fifty furnaces for example and wherein the dust or particulate concentration varies within certain areas of the building. Thus, valves 54 controlling contaminated gas flow from areas of relatively large dust or particulate concentration can be initially opened widely as opposed to those slightly opened or closed valves 54 controlling gas flow from areas producing little or no solid particles. Of course, more or less than four pick-up stations can be employed in dust removal system 10', as desired. The treated or cleaned gases leaving bag house 62 are conveyed through a conduit 64, having a flow control damper or valve 66 therein, into the upper end of stack 48 and are mixed with the untreated, contaminated gases in the mainstream flowing upwardly in stack 48 via conduit 46.

A particulate monitor 68, similar to monitor 32 previously described, is incorporated in dust removal system 10' and is provided with a probe 70 located in stack 48 adjacent the upper end thereof for sensing or detecting the amount of solids present in the final gaseous effluent discharged. The detection responsive control means (not shown) in monitor 68 is operatively connected to valve 66 for opening or closing the latter in accordance with the amount of solids detected in the final effluent relative to the permissable amount to increase or decrease the relative proportion of contaminated gases treated or processed through the gas treating means.

Monitor 68 can be operatively connected to each of the valve 54 to individually control the flow of contaminated gases therethrough in accordance with the variance of dust concentration in different areas of building 40. However, this does not affect the proportion of the total amount of contaminated gases to be treated relative to the amount of the untreated portion.

As hereinbefore mentioned, the foregoing illustrative embodiments of this invention are equally effective in monitoring gaseous effluents containing contaminated or polluted gaseous components as well as effluents containing particulates. The term "contaminants," as used herein, is taken to include both polluted gaseous components and particulates.

From the foregoing, it is apparent that the objects of the present invention have been fully accomplished. As a result of this invention, an improved contaminant removal system is provided for treating only a portion of a contaminated effluent to reduce the total amount of contaminants emitted into the atmosphere within the permissible limits prescribed by various pollution abatement laws.

Preferred embodiments of this invention having been described and illustrated in detail, it is to be understood that this has been done by way of illustration only.

I claim:

1. A method of controlling the amount of contaminants present in a gaseous effluent comprising: treating a portion of a gaseous effluent to remove contaminants therefrom; mixing said treated portion with an untreated portion of said effluent to form a total effluent; detecting the amount of contaminants present in said total effluent; and varying the relative proportions of said treated and untreated portions in accordance with the amount of contaminants detected in said total effluent relative to a permissable amount.

2. A system for controlling the amount of contaminants present in a gaseous effluent comprising: passage means for conveying a gaseous effluent in a mainstream; means for treating gaseous effluents to remove contaminants therefrom; means for rerouting a portion of said gaseous effluent from said mainstream through said treating means; means for delivering said treated portion of said effluent to said mainstream; means downstream of said delivering means for detecting and analyzing the amount of contaminants in said effluent mainstream; and means responsive to said sensing means for varying the relative proportion of effluent rerouted for processing through said treating means.

3. A system according to claim 2 wherein said rerouting means includes a blower for withdrawing said portion of gaseous effluent from said mainstream and directing such portion to said treating means.

4. A system according to claim 2 wherein said responsive means includes a valve in said delivering means for controlling the flow of treated gases to said mainstream.

5. A system according to claim 2 wherein said passage means includes a manifold located adjacent the ceiling of a building, and a stack having one end thereof in communication with said manifold for conveying said effluent mainstream to a remote location.

6. A system according to claim 5 wherein said rerouting means includes a plurality of effluent pick-up ducts leading to a common conduit, said common conduit being in communication with said treating means.

* * * * *

UNITED STATES PATENT OFFICE
CERTIFICATE OF CORRECTION

Patent No. 3,772,851        Dated November 20, 1973

Inventor(s) Joseph G. Duffey

It is certified that error appears in the above-identified patent and that said Letters Patent are hereby corrected as shown below:

In the heading the following should appear:

[73] Assignee:  Andco Incorporated, Buffalo, New York

Signed and sealed this 2nd day of July 1974.

(SEAL)
Attest:

EDWARD M. FLETCHER, JR.
Attesting Officer

C. MARSHALL DANN
Commissioner of Patents